US011019032B2

(12) United States Patent
Slutsker et al.

(10) Patent No.: US 11,019,032 B2
(45) Date of Patent: May 25, 2021

(54) VIRTUAL PRIVATE NETWORKS WITHOUT SOFTWARE REQUIREMENTS

(71) Applicant: Cisco Technology, Inc., San Jose, CA (US)

(72) Inventors: Igor Slutsker, Santa Clara, CA (US); Javier I. Contreras Albesa, Sant Cugat del Valles (ES)

(73) Assignee: Cisco Technology, Inc., San Jose, CA (US)

( * ) Notice: Subject to any disclaimer, the term of this patent is extended or adjusted under 35 U.S.C. 154(b) by 201 days.

(21) Appl. No.: 16/126,783

(22) Filed: Sep. 10, 2018

(65) Prior Publication Data
US 2019/0081931 A1 Mar. 14, 2019

(30) Foreign Application Priority Data
Sep. 12, 2017 (EP) .................................. 7190721

(51) Int. Cl.
*G06F 9/00* (2006.01)
*G06F 15/16* (2006.01)
(Continued)

(52) U.S. Cl.
CPC ........ *H04L 63/0272* (2013.01); *H04L 61/256* (2013.01); *H04L 63/0428* (2013.01);
(Continued)

(58) Field of Classification Search
CPC ............. H04L 63/0272; H04L 63/0428; H04L 63/166; H04L 61/256; H04L 63/0892;
(Continued)

(56) References Cited

U.S. PATENT DOCUMENTS 8,356,343 B1\* 1/2013 Breau ............... H04W 12/0602
726/12
2015/0319615 A1\* 11/2015 E .......................... H04W 48/02
726/4
(Continued)

FOREIGN PATENT DOCUMENTS

EP 3065371 A1 9/2016
WO 2014107969 A1 7/2014

OTHER PUBLICATIONS

European Paten Office Examination Report for Application No. 17 190 721.5-1218 dated Oct. 23, 2019.
(Continued)

*Primary Examiner* — Amie C. Lin
(74) *Attorney, Agent, or Firm* — Patterson + Sheridan, LLP (57) ABSTRACT

Techniques to perform an operation comprising determining, by a local area network (LAN) controller, that a first device has connected to a predefined service set identifier (SSID) of a first wireless access point (AP), of a plurality of wireless APs, receiving, by the LAN controller from the first device, an Extensible Authentication Protocol (EAP) response specifying a destination address of a first private LAN controller associated with a first private network, creating, by the LAN controller based on the destination address, a Control and Provisioning of Wireless Access Points (CAPWAP) tunnel between the first wireless AP and the first private LAN controller, and configuring, by the LAN controller, the first wireless AP to broadcast a private SSID associated with the first private network, wherein the first device accesses the first private network via the CAPWAP tunnel by connecting to the first wireless AP using the private SSID.

17 Claims, 6 Drawing Sheets

(51) Int. Cl.
  *G06F 17/00* (2019.01)
  *H04L 29/06* (2006.01)
  *H04W 12/02* (2009.01)
  *H04W 12/06* (2021.01)
  *H04W 84/12* (2009.01)
  *H04W 76/12* (2018.01)
  *H04W 76/16* (2018.01)
  *H04L 29/12* (2006.01)
  *H04W 48/16* (2009.01)
  *H04W 48/20* (2009.01)
  *H04W 88/12* (2009.01)
  *H04W 88/02* (2009.01)
  *H04W 88/08* (2009.01)

(52) U.S. Cl.
  CPC ........... *H04L 63/166* (2013.01); *H04W 12/02* (2013.01); *H04W 12/06* (2013.01); *H04W 48/16* (2013.01); *H04W 48/20* (2013.01); *H04W 76/12* (2018.02); *H04W 76/16* (2018.02); *H04W 84/12* (2013.01); *H04W 88/02* (2013.01); *H04W 88/08* (2013.01); *H04W 88/12* (2013.01)

(58) Field of Classification Search
  CPC ..... H04W 48/20; H04W 48/16; H04W 76/16; H04W 76/12; H04W 84/12; H04W 12/06; H04W 12/02; H04W 88/12; H04W 88/08; H04W 88/02; H04W 48/12
  See application file for complete search history.

(56) References Cited

U.S. PATENT DOCUMENTS

2016/0020922 A1* 1/2016 Sung ................. H04W 28/08
  370/329
2016/0095153 A1* 3/2016 Chechani ............ H04L 63/0272
  370/338

OTHER PUBLICATIONS

The Extended European Search Report for Application No. 17190725-1870 dated Nov. 24, 2017.

* cited by examiner

VIRTUAL PRIVATE NETWORKS WITHOUT SOFTWARE REQUIREMENTS

CROSS-REFERENCE TO RELATED APPLICATIONS

This application claims benefit of European patent application Serial No. EP17190721.5, filed Sep. 12, 2017. The aforementioned related patent application is herein incorporated by reference in its entirety

TECHNICAL FIELD

Aspects presented in this disclosure generally relate to computer networks. More specifically, aspects disclosed herein relate to virtual private networks (VPNs) that do not require dedicated VPN software on client devices seeking to access a given VPN.

BACKGROUND

A VPN extends a private network across a public network, and enables client devices to send and receive data across shared or public networks as if the client devices were directly connected to the private network. Conventionally, a VPN application or other software mechanism executing on a client device is required to authenticate the client device before establishing a VPN connection. However, the VPN application adds additional overhead to users attempting to connect to a VPN. For example, a user wishing to send a single email must first authenticate via the VPN application, which often takes longer than composing and sending the email.

BRIEF DESCRIPTION OF THE DRAWINGS

So that the manner in which the above-recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DESCRIPTION OF EXAMPLE ASPECTS

Overview

In one aspect disclosed herein, a method comprises determining, by a local area network (LAN) controller, that a first device has connected to a first wireless access point (AP), of a plurality of wireless APs, using a predefined service set identifier (SSID); receiving, by the LAN controller from the first device, an Extensible Authentication Protocol (EAP) response specifying a destination address of a first private LAN controller associated with a first private network; creating, by the LAN controller based on the destination address, a Control and Provisioning of Wireless Access Points (CAPWAP) tunnel between the first wireless AP and the first private LAN controller; and configuring, by the LAN controller, the first wireless AP to broadcast a private SSID associated with the first private network, wherein the first device accesses the first private network via the CAPWAP tunnel by connecting to the first wireless AP using the private SSID.

In another aspect, a system comprises a processor and a memory storing instructions, which when executed by the processor, performs an operation comprising determining that a first device has connected to a first wireless access point (AP), of a plurality of wireless APs, using a predefined service set identifier (SSID); receiving, from the first device, an Extensible Authentication Protocol (EAP) response specifying a destination address of a first private LAN controller associated with a first private network; creating, based on the destination address, a Control and Provisioning of Wireless Access Points (CAPWAP) tunnel between the first wireless AP and the first private LAN controller; and configuring the first wireless AP to broadcast a private SSID associated with the first private network, wherein the first device accesses the first private network via the CAPWAP tunnel by connecting to the first wireless AP using the private SSID.

In another aspect, a non-transitory computer-readable storage medium stores instructions which when executed by a processor performs an operation comprising determining, by a local area network (LAN) controller, that a first device has connected to a first wireless access point (AP), of a plurality of wireless APs, using a predefined service set identifier (SSID); receiving, by the LAN controller from the first device, an Extensible Authentication Protocol (EAP) response specifying a destination address of a first private LAN controller associated with a first private network; creating, by the LAN controller based on the destination address, a Control and Provisioning of Wireless Access Points (CAPWAP) tunnel between the first wireless AP and the first private LAN controller; and broadcasting, by the first wireless AP, a private SSID associated with the first private network, wherein the first device accesses the first private network via the CAPWAP tunnel by connecting to the first wireless AP using the private SSID.

EXAMPLE ASPECTS

Aspects disclosed herein allow client devices to join virtual private networks with minimal network re-configuration and without needing additional VPN software executing on the client device. Generally, aspects disclosed herein extend Control and Provisioning of Wireless Access Points (CAPWAP) tunnels with dynamic tunnel creation to destination endpoints (e.g., corporate networks, private networks), based on information presented by the client device, during an Extensible Authentication Protocol (EAP) identity request. To do so, aspects disclosed herein provide parsing and state handling for EAP-ID responses to allow the creation of CAPWAP tunnels between a given access point and a given private network controller. In some aspects, CAPWAP tunnels between multiple APs and a given private network controller are aggregated into a single tunnel. In some aspects, a wireless local area network (LAN) controller (WLC) performs network address translation (NAT) for AP CAPWAP traffic that targets external destinations (e.g., destinations outside of the VPN and/or private network).

Figure 1A:
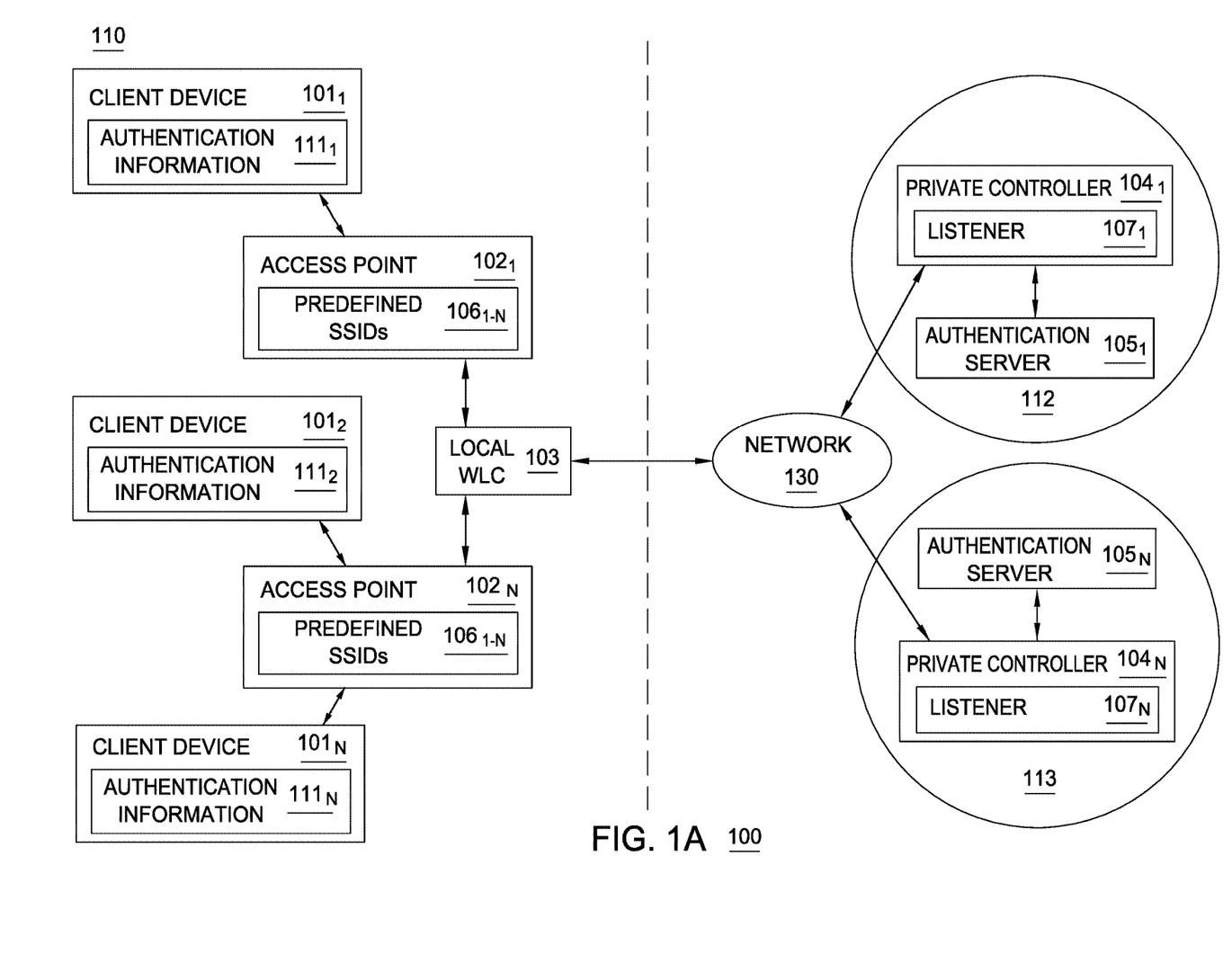
FIGS. 1A-1B depict a system architecture which provides virtual private networks without additional software requirements on client devices, according to one aspect.

FIG. 1A depicts a system architecture 100 which provides virtual private networks without additional VPN software on client devices, according to one aspect. As shown, the system 100 includes a plurality of client devices $101_{1-N}$, a plurality of wireless access points $102_{1-N}$, a local WLC 103, a plurality of private controllers $104_{1-N}$, and a plurality of authentication servers $105_{1-N}$. Generally, the system 100 may include any number of client devices $101_{1-N}$, wireless APs $102_{1-N}$, private controllers $104_{1-N}$, and authentication servers $105_{1-N}$.

The client devices $101_{1-N}$ are representative of any type of computing device, such as a laptop computer, desktop computer, smart phone, tablet computer, portable gaming device, and the like. The client devices $101_{1-N}$ (and corresponding users) may be situated in any type of environment, such as a hotel, convention center, hospital, dormitory, and the like, where users need to connect to different VPNs. For example, employees of different corporations staying in a hotel may each need to connect to their respective corporate VPNs. The use of a hotel as an example environment herein should not be considered limiting of the disclosure. As shown, each client device $101_{1-N}$ stores authentication information $111_{1-N}$, respectively. The authentication information $111_{1-N}$ is representative of any type of information which enables IEEE 802.1x authentication. One example of IEEE 802.1x-based authentication is the Extensible Authentication Protocol (EAP). Therefore, in such examples, the authentication information $111_{1-N}$ includes an EAP identifier (ID) for an associated user.

The local WLC 103 is a device configured to manage the access points $102_{1-N}$ and enable the client devices $101_{1-N}$ to join VPNs using modified CAPWAP tunnels. For example, a hotel may have a WLC 103 that connects the client devices $101_{1-N}$ and/or access points $102_{1-N}$ to the network 130. In one aspect, the network 130 is the Internet. Therefore, entities to the left of the dashed line in FIG. 1A are considered to be on the same LAN 110 (e.g. a LAN in the hotel). Similarly, entities on the right side of the dashed line (e.g., the private controllers $104_{1-N}$, authentication servers $105_{1-N}$, and any external destination device) are considered to be external to the hotel LAN 110. The local WLC 103 is further configured to parse and perform state handling on EAP-ID responses generated by the client devices $101_{1-N}$ responsive to EAP-ID requests sent to client devices $101_{1-N}$ by the local WLC 103. For example, the local WLC 103 is configured to extract a destination address of a private controller $104_{1-N}$ specified in an EAP-ID response generated by the client devices $101_{1-N}$. The local WLC 103 is further configured to communicate with the private controllers $104_{1-N}$ to establish secure tunnels there between.

The private controllers $104_{1-N}$ are devices generally configured to control access to an associated private network and any resources and/or devices therein. For example, in one aspect, private controller $104_1$ is associated with the private network 112 of "Example1" corporation, while private controller $104_N$ is associated with the private network 113 of "ExampleN" corporation. In one aspect, the private controllers $104_{1-N}$ are wireless LAN controllers. The authentication servers $105_{1-N}$ are associated with a respective private controller $104_{1-N}$. In one aspect, the authentication servers $104_{1-N}$ are authentication, authorization, and accounting (AAA) servers configured to authenticate users and/or the client devices $101_{1-N}$ (e.g., based on the authentication information $111_{1-N}$) to allow access to the corporate VPN. In one aspect, the private controllers $104_{1-N}$ and/or authentication servers $105_{1-N}$ support the Remote Authentication Dial-In User Service (RADIUS) protocol and EAP.

The wireless access points $102_{1-N}$ are wireless transceivers configured to provide wireless connectivity to the client devices $101_{1-N}$. The wireless access points $102_{1-N}$ may implement any wireless protocol, such IEEE 802.11 wireless. As shown, each AP $102_{1-N}$ includes one or more predefined service set identifiers (SSIDs) $106_{1-N}$, where each predefined SSID $106_N$ is associated with a respective private network and/or corresponding private controller $104_N$. For example, the predefined SSID $106_1$ may be "Example1" for the Example1 corporation and/or the private controller $104_1$. Each predefined SSID $106_{1-N}$ is encrypted (e.g., with WPA2/802.1x encryption).

Advantageously, the client devices $101_{1-N}$ need not execute dedicated VPN software to connect to a VPN. For example, if the user of client device $101_1$ wishes to connect to the private network 112 associated with the private controller $104_1$ (e.g., for the Example1 corporation), the user causes the client device $101_1$ to establish a wireless data connection using the predefined SSID $106_1$ (which is associated with private network 112 of the Example1 corporation) broadcast by the AP $102_1$. The local WLC 103 may then receive an indication that the client device $101_1$ connected to the AP $102_1$ using predefined SSID $106_1$. In response, the local WLC 103 generates and sends an EAP-ID request to the client device $101_1$. The client device $101_1$ receives the EAP ID request and generates an EAP ID response. The EAP-ID response includes the authentication information $111_1$, e.g., the EAP identifier of the user. The EAP-ID response further includes a tunnel identifier, e.g., a destination address. In at least one aspect, the destination address is stored in an available field of the EAP-ID response. The destination address may be an Internet protocol (IP) address and/or a domain name. Continuing with the previous example, the destination address may be an IP address of the private controller $104_1$, or a domain name of the private controller $104_1$ (e.g., vpn.example1.com). In at least one aspect, the destination address is specified in the authentication information $111_1$.

The local WLC 103 receives the EAP-ID response from the client device $101_1$, and extracts the destination address therefrom. In response, the WLC 103 signals to the AP $102_1$ to initiate a CAPWAP tunnel towards the destination address. In response, the AP $102_1$ initiates Datagram Transport Layer Security (DTLS) negotiation with the local WLC 103. However, the AP $102_1$ may specify an indication that the DTLS negotiation is to establish a CAPWAP tunnel. In response, the local WLC 103 sends a request to the listener $107_1$ of the private controller $104_1$. The local WLC 103 includes information from the EAP-ID response generated by the client device $101_1$, which includes at least the authentication information $111_1$. The listeners $107_{1-N}$ of the private controllers $104_{1-N}$ are configured to facilitate communication between the private controllers $104_{1-N}$ and the local WLC 103 (e.g., to process requests from the local WLC 103 to establish a CAPWAP tunnel between an AP $102_{1-N}$ and the corresponding private controller $104_{1-N}$). The listener $107_1$ of the private controller $104_1$ (or another designated component thereof) then establishes a secure CAPWAP tunnel with the local WLC 103. The listener $107_1$ also initiates EAP authentication between the authentication server $105_1$, the AP $102_1$ and/or client device $101_1$ using the EAP-ID response generated by the client device $101_1$. According to various aspects, the CAPWAP tunnel is generated before, during, and/or after the client device $101_1$ is authenticated using EAP. However, if the client device $101_1$ is not successfully authenticated, the CAPWAP tunnel is removed (or not created, as the case may be). Furthermore, data link encryption is configured on the CAPWAP tunnel to encrypt data packets transmitted via the CAPWAP tunnel.

Once the local WLC 103 receives an indication (e.g., from the private controller $104_1$) that the CAPWAP tunnel has been created and the client device $101_1$ has been authenticated by the authentication server $105_1$, the local WLC 103 configures IP network address translation (NAT). Generally, NAT is a method of remapping one IP address space into another by modifying network address information in IP data packet headers. In doing so, the local WLC 103 creates one or more entries in a NAT table. The entries in the NAT table cause the local WLC 103 to modify the source IP address of data packets sent by the client device $101_1$ from the IP address of the client device $101_1$ to the IP address of the local WLC 103. Additionally, the entries in the NAT table cause the local WLC 103 to modify the destination IP address of data packets sent by the client device $101_1$ to be the IP address of the private controller $104_1$. Further still, the entries in the NAT table cause the local WLC 103 to modify the destination IP address of external data packets to specify the IP address of the client device $101_1$. More generally, data traffic between the client device $101_1$ and/or AP $102_1$ specify the local WLC 103 as a NAT endpoint, providing a single exit point towards the Internet from the local WLC 103.

Figure 1B:
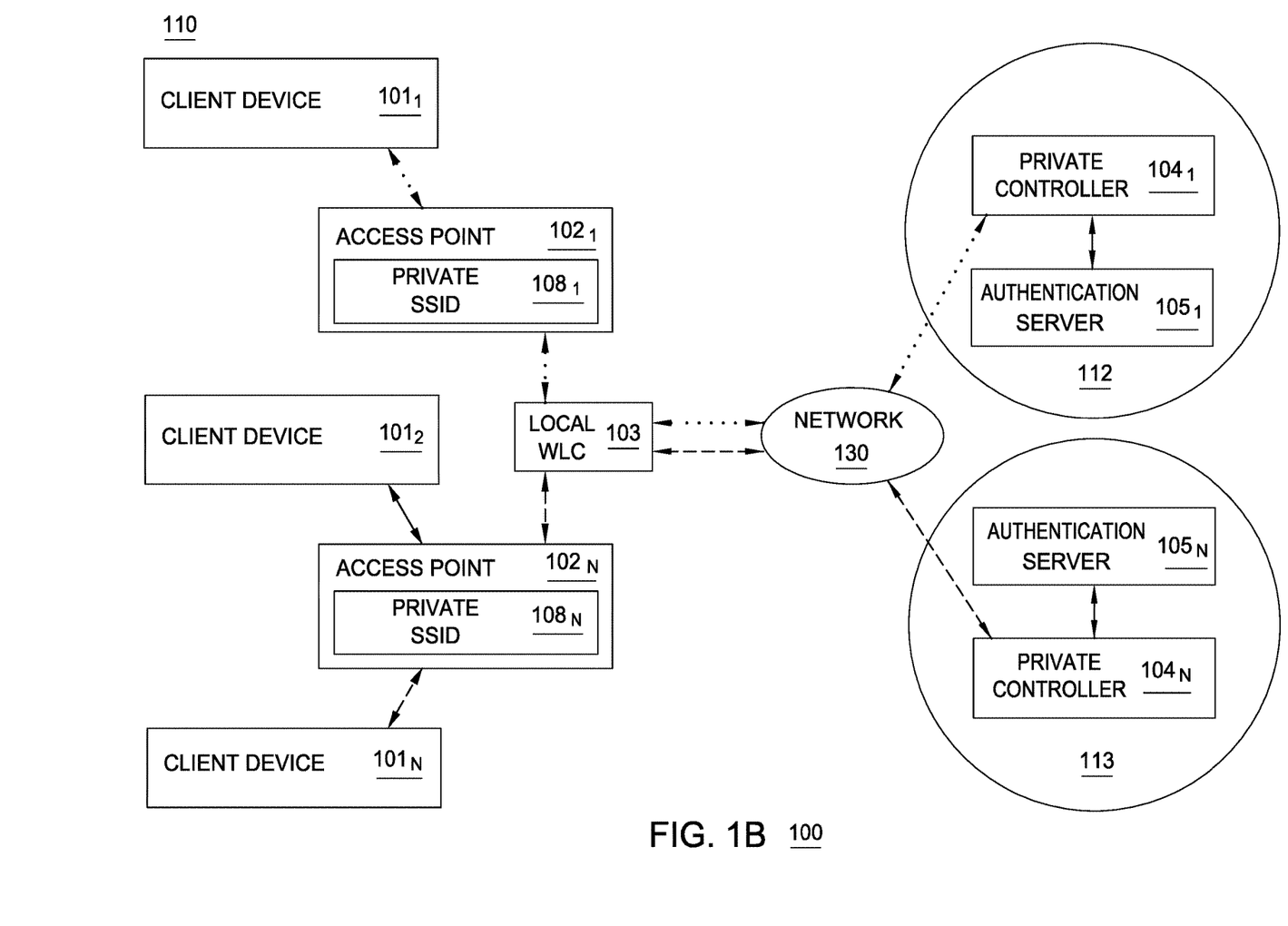

With the CAPWAP tunnel established between the AP $102_1$ and the private controller $104_1$, the AP $102_1$ begins broadcasting a new SSID associated with the private network 112. FIG. 1B depicts such an aspect. As shown, the AP $102_1$ broadcasts a private SSID $108_1$ (note that in some aspects, the AP $102_1$ continues to broadcast one or more predefined SSIDs $106_{1-N}$ and/or one or more other private SSIDs $108_{2-N}$). An example private SSID $108_1$ is "Example1VPN" for the private network 112 of Example1 corporation. In at least one aspect, the private controller $104_1$ configures the AP $102_1$ to include and broadcast the private SSID $108_1$. The client device $101_1$ then connects to the AP $102_1$ using the private SSID $108_1$, which "extends" the private network 112 to include the client device $101_1$, via the secure, encrypted CAPWAP tunnel depicted in FIG. 1B by dotted lines. In one aspect, a user manually causes the client device $101_1$ to connect to the private SSID $108_1$ (and disconnect from the predefined SSID $106_1$). In other aspects, the AP $102_1$ automatically disconnects the client device $101_1$ from the predefined SSID $106_1$ and directs the client device $101_1$ to connect to the private SSID $108_1$.

Furthermore, FIG. 1B depicts an aspect where a CAPWAP tunnel (depicted by dashed lines) has been established as described above between the AP $102_N$ and the private controller $104_N$. When the client device $101_N$, which has been authenticated by private controller $104_N$ and/or authentication server $105_N$, connects to the private SSID $108_N$ for the private network 113, the private network 113 is extended to include the client device $101_N$.

In some aspects, a given AP $102_{1-N}$ broadcasts more than one private SSID $108_{1-N}$, assuming a CAPWAP tunnel has been established between the AP $102_{1-N}$ and the respective private controller $104_N$. In such aspects, the local WLC 103 aggregates the tunnels for each respective private controller $104_{1-N}$. Therefore, in such aspects, a single, aggregated CAPWAP tunnel exists between the local WLC 103 and a given private controller $104_{1-N}$. For example, the users of client devices $101_{1,2}$ may be employees of the Example1 corporation. Assuming the client device $102_1$ connects to AP $102_N$, and the above described steps are performed, a CAPWAP tunnel exists between AP $102_N$ and the private controller $104_1$. However, the local WLC 103 aggregates the CAPWAP tunnels of the APs $101_{1-N}$, such that only a single tunnel exists between the local WLC 103 and the private controller $104_1$.

Furthermore, in some aspects, each APs $102_{1-N}$ limits the number of client devices $101_{1-N}$ that can establish a CAPWAP tunnel with any of the private controllers $104_{1-N}$. In some aspects, CAPWAP tunnels are subject to a timeout, where a given CAPWAP tunnel is terminated after some predefined time period of inactivity. Furthermore, in some aspects, each client device $101_{1-N}$ is limited as to the number of private controllers $104_{1-N}$ with which a CAPWAP tunnel can be created. For example, if device $101_2$ attempts to connect to a number of private controllers $104_{1-N}$ that exceeds a threshold, the local WLC 103 may drop each subsequent request once the threshold is reached. In some aspects, if a client device $101_{1-N}$ is not authenticated after a predefined number of attempts (and/or within an authentication time threshold), the corresponding AP $102_{1-N}$ to which the client device $101_{1-N}$ is connected transmits an indication to the local WLC 103. Doing so allows the local WLC 103 to perform 802.1x client exclusion on the unauthenticated client device $101_{1-N}$, preventing the unauthenticated client device $101_{1-N}$ from engaging in denial of service (DoS) attacks by initiating multiple, repeated EAP authentication requests. In some aspects, the local WLC 103 controls the rates of traffic sent by the client devices $101_{1-N}$ targeting the network 130.

Advantageously, because data traffic is encrypted by the APs $102_{1-N}$ (and by wireless encryption), unencrypted information is never exposed to any infrastructure point in the LAN 110 and/or network 130. Furthermore, each AP $102_{1-N}$ remains under the control of the local WLC 103. Similarly, the corporation need not manage the local WLC 103, as the local WLC 103 remains under the control of the responsible administrator.

Figure 2:
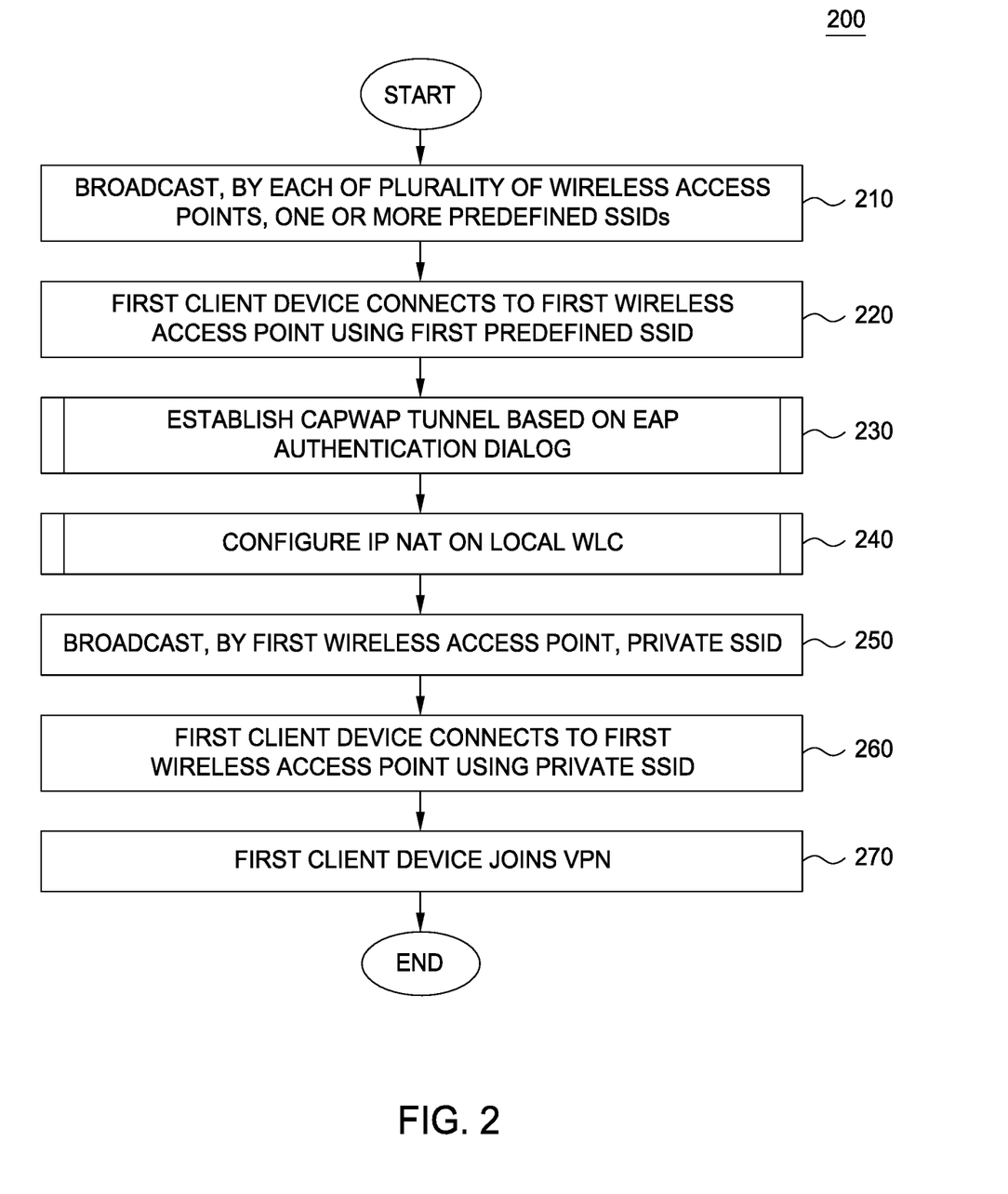
FIG. 2 is a flow chart illustrating a method to provide virtual private networks without additional software requirements on client devices, according to one aspect.

FIG. 2 is a flow chart illustrating a method 200 to provide virtual private networks without additional VPN software requirements on client devices, according to one aspect. As shown, the method 200 begins at block 210, where each of a plurality of wireless APs $102_{1-N}$ broadcast one or more predefined SSIDs $106_{1-N}$. Each predefined SSID $106_{1-N}$ is associated with a respective private network and/or private controller $104_{1-N}$. At block 220, a first client device $101_N$ connects to a first predefined SSID $106_N$ of a first wireless AP $102_N$. At block 230, described in greater detail with reference to FIG. 3, the first wireless AP $102_N$ establishes a CAPWAP tunnel with the corresponding private controller $104_N$ based on an EAP authentication dialog. Generally, the first wireless AP $102_N$ and the local WLC 103 leverage the destination information specified in the EAP-ID response generated by the first client device $101_N$ to establish the CAPWAP tunnel.

At block 240, described in greater detail with reference to FIG. 4, the local WLC 103 configures IP NAT. Doing so allows traffic to be appropriately routed between the client device $101_N$ (and/or first AP $102_N$) and the private controller $104_N$. At block 250, the first wireless AP $102_N$ broadcasts the private SSID $108_N$ associated with the private controller $104_N$ (and/or the corresponding private network). In at least one aspect, the local WLC 103 configures the first wireless AP $102_N$ to broadcast the private SSID $108_N$. At block 260, the first client device $101_N$ connects to the private SSID $108_N$ advertised by the first wireless AP $102_N$. Doing so extends the private network to include the client device $101_N$, whereby the first client device $101_N$ joins the VPN at block 270. Stated differently, the first client device $101_N$ accesses the private network via the CAPWAP tunnel by connecting to the private SSID $108_N$.

Figure 3:
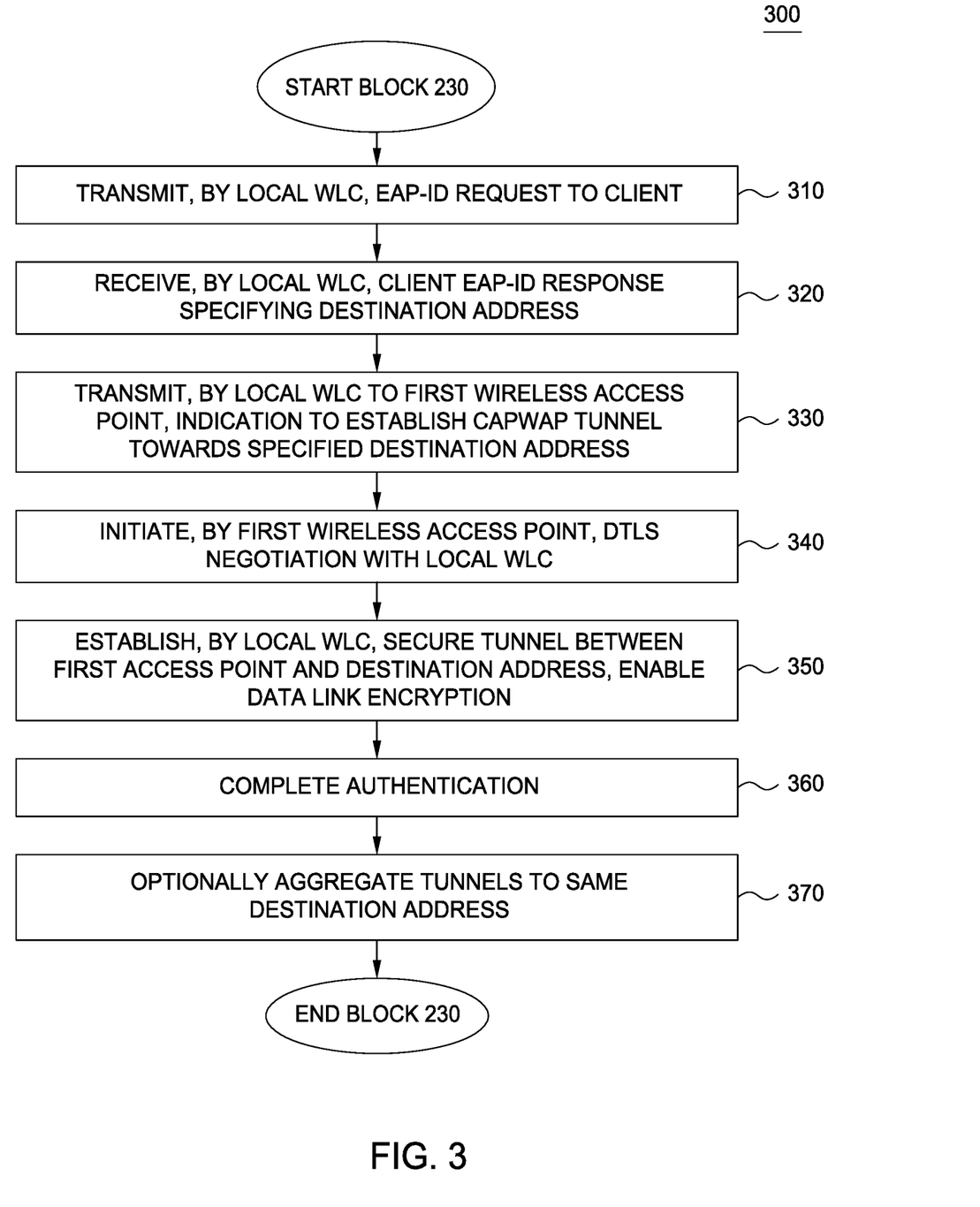
FIG. 3 is a flow chart illustrating a method to establish a modified CAPWAP tunnel based on an EAP authentication dialog, according to one aspect.

FIG. 3 is a flow chart illustrating a method 300 corresponding to block 230 to establish a modified CAPWAP tunnel based on an EAP authentication dialog, according to one aspect. As shown, the method 300 begins at block 310, where the local WLC 103 sends an EAP-ID request to the client device $101_N$. At block 320, the local WLC 103 receives, from the client device $101_N$, an EAP-ID response specifying a tunnel identifier (e.g., a destination address) of the private controller $104_N$. As previously stated, the destination address may be one or more of an IP address and a domain name, and is extracted by the local WLC 103 from the EAP-ID response. In at least one aspect, the EAP-ID response further includes an indication of one of a plurality of aggregated CAPWAP tunnels for a given private controller $104_{1-N}$. At block 330, the local WLC 103 transmits an indication to the first wireless AP $102_N$ specifying to establish a CAPWAP tunnel towards the destination address specified in the EAP-ID response received at block 320. The indication includes the destination address specified in the EAP-ID response received at block 320.

At block 340, the first wireless AP $102_N$ initiates DTLS negotiation with the local WLC 103. However, the AP $102_N$ flags (e.g., sets one or more indicator fields) the DTLS negotiation as being for the creation of a CAPWAP tunnel. At block 350, the local WLC 103 establishes a secure CAPWAP tunnel between the first wireless AP $102_N$ and the destination address of the private controller $104_N$. Furthermore, the data link encryption is enabled on the CAPWAP tunnel. As previously stated, the listener $107_N$ of the private controller $104_N$ is configured to communicate with the local WLC 103 to establish a secure tunnel. At block 360, the client device $101_N$ is authenticated. At block 370, the local WLC 103 optionally aggregates CAPWAP tunnels to the same destination (e.g., a given private controller $104_N$), such that only a single CAPWAP tunnel exists between the local WLC 103 and a given private controller $104_N$. In such aspects, the local WLC 103 assigns a unique identifier to each CAPWAP tunnel that has been aggregated for a given private controller $104_N$. Furthermore, the client devices $101_{1-N}$ and/or APs $102_{1-N}$ may include an indication of the tunnel identifier in subsequent traffic. Similarly, the local WLC 103 may include a table which associates client devices $101_{1-N}$ and/or APs $102_{1-N}$ with a given tunnel identifier.

Figure 4:
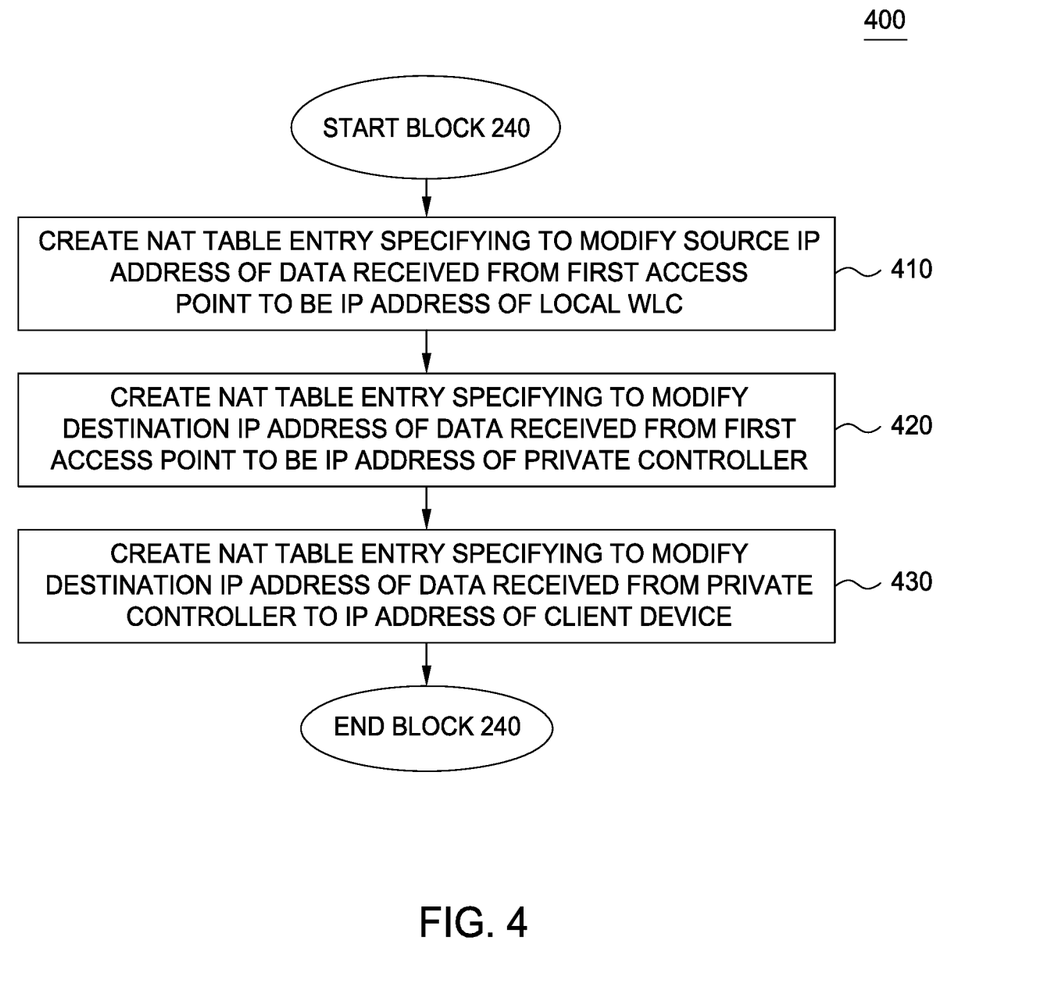
FIG. 4 is a flow chart illustrating a method to configure IP NAT on a local WLC, according to one aspect.

FIG. 4 is a flow chart illustrating a method 400 corresponding to block 240 to configure IP NAT on a local WLC, according to one aspect. As shown, the method 400 begins at block 410, where the local WLC 103 creates a NAT translation table entry specifying to modify the source IP address of data received from the first wireless AP $102_N$ to be the IP address of the local WLC 103. At block 420, the local WLC 103 creates a NAT translation table entry specifying to modify the destination IP address of data received from the first wireless AP $102_N$ to be the IP address of the private controller $104_N$. At block 430, the local WLC 103 creates a NAT translation table entry specifying to modify the destination IP address of data received from the private controller $104_N$ to the IP address of the client device $101_N$.

Figure 5:
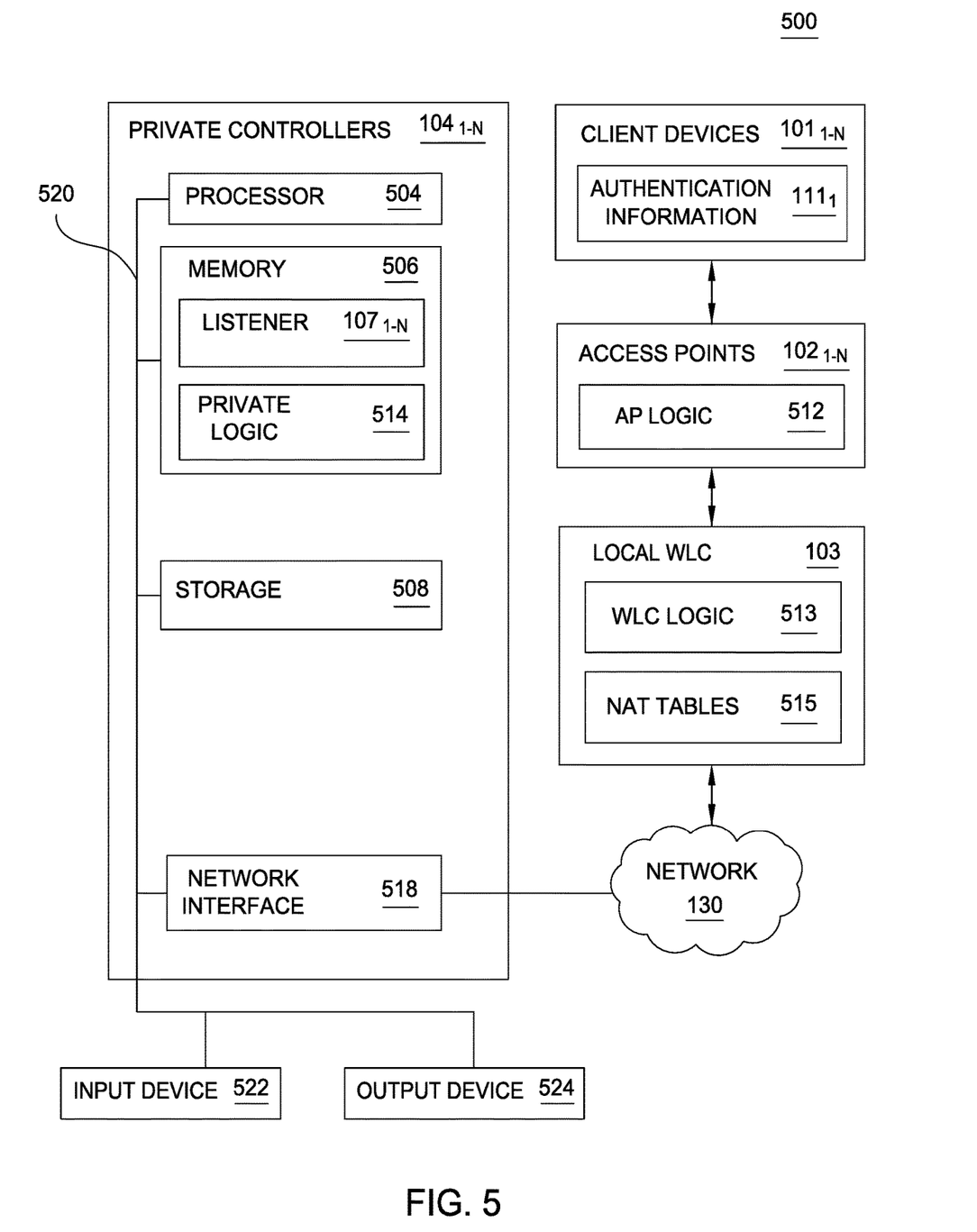
FIG. 5 is a block diagram illustrating a system which provides virtual private networks without additional software requirements on client devices, according to one aspect.

FIG. 5 is a block diagram illustrating a system 500 which provides virtual private networks without additional VPN software requirements on client devices, according to one aspect. The networked system 500 includes the private controllers $104_{1-N}$. The private controllers $104_{1-N}$ may also be connected to other computers and devices (e.g., the local WLC 103, the APs $102_{1-N}$, and the client devices $101_{1-N}$) via the network 130. In general, the network 130 may be a telecommunications network and/or a wide area network (WAN). In a particular aspect, the network 130 is the Internet.

The private controllers $104_{1-N}$ generally include a processor 504 which obtains instructions and data via a bus 520 from a memory 506 and/or a storage 508. The private controllers $104_{1-N}$ may also include one or more network interface devices 518, input devices 522, and output devices 524 connected to the bus 520. The private controllers $104_{1-N}$ are generally under the control of an operating system (not shown). Examples of operating systems include the UNIX operating system and distributions of the Linux operating system. (UNIX is a registered trademark of The Open Group in the United States and other countries. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the private controllers $104_{1-N}$. In addition, the memory 506 and the storage 508 may be considered to include memory physically located elsewhere; for example, on another computer coupled to the private controllers $104_{1-N}$ via the bus 520.

The input device 522 may be any device for providing input to the private controllers $104_{1-N}$. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the private controllers $104_{1-N}$. The output device 524 may include output devices such as monitors, touch screen displays, and so on.

As shown, the memory 506 contains the listener 107, described in greater detail above. The memory 506 further includes the private logic 514, which is configured to implement all functionality of the private controllers $104_{1-N}$ described herein.

Although not depicted for the sake of clarity, the local WLC 103, each AP $102_{1-N}$, and each client devices $101_{1-N}$ includes at least a respective processor 504, memory 506, storage 508, network interface 518, bus 520, input device 522, and output device 524. As shown, the APs $102_{1-N}$ include an access point (AP) logic 512, which is hardware and/or software configured to implement all functionality of the APs $102_{1-N}$ described herein. Similarly, the local WLC 103 includes a WLC logic 113, which is hardware and/or software configured to implement all functionality of the WLC 103 described herein. The local WLC 103 further includes the NAT tables 515, which store translations used to map IP addresses from one address space to a different address space while they are in transit across the local WLC 103. More generally, the system 500 is configured to implement all systems, methods, apparatuses, and functionality described herein with reference to FIGS. 1A-B and 2-4.

Advantageously, aspects disclosed herein allow client devices to joint virtual private networks without requiring dedicated VPN software on the client device. By extending CAPWAP tunnels from wireless access points to private controllers, all data remains encrypted while passing through the local infrastructure (e.g., the APs $102_{1-N}$, local WLC 103, etc.). Furthermore, the APs $102_{1-N}$ and local WLC 103 remain under the control of the property owner/manager with minimal reconfiguration necessary to add or remove support for corporate clients (or any other entity managing a private network). The WLC 103 acts as a relay for CAPWAP tunnels between the wireless access points and private controllers $104_{1-N}$.

In the preceding, reference is made to aspects presented in this disclosure. However, the scope of the present disclosure is not limited to specific described aspects. Instead, any combination of the described features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the aspects disclosed herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to aspects presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various aspects. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   determining, by a local area network (LAN) controller, that a first device has connected to a first wireless access point (AP), of a plurality of wireless APs, using a predefined service set identifier (SSID) relating to a first private LAN controller associated with a first private network and broadcast by the first wireless AP;
   in response to the determining that the first device has connected to the first wireless AP, receiving, by the LAN controller from the first device, an Extensible Authentication Protocol (EAP) response specifying a destination address of the first private LAN controller associated with the first private network;
   creating, by the LAN controller based on the destination address and in response to the connection of the first device to the first wireless AP using the predefined SSID, a first Control and Provisioning of Wireless Access Points (CAPWAP) tunnel between the first wireless AP and the first private LAN controller, wherein the creating the first CAPWAP tunnel comprises the first wireless AP initiating Datagram Transport Layer Security (DTLS) negotiation with the LAN controller for establishing the first CAPWAP tunnel;
   aggregating, by the LAN controller, a plurality of CAPWAP tunnels between the plurality of wireless APs and the first private LAN controller such that only an aggregated CAPWAP tunnel exists between the LAN controller and the first private LAN controller; and
   in response to the creating the first CAPWAP tunnel, configuring, by the LAN controller, the first wireless AP to broadcast a private SSID associated with the first private network, wherein the first device is configured to access the first private network via the first CAPWAP tunnel by disconnecting from the connection with the first wireless AP that uses the predefined SSID and establishing a new connection with the first wireless AP using the private SSID.

2. The method of claim 1, further comprising prior to the receiving the EAP response:
   transmitting, by the LAN controller, an EAP request to the first device, wherein the first device generates and transmits the EAP response responsive to receiving the EAP request.

3. The method of claim 1, wherein the creating the first CAPWAP tunnel further comprises:
   transmitting, by the LAN controller to the first wireless AP, a first indication to establish the first CAPWAP tunnel;
   transmitting, by the first wireless AP to the LAN controller, a second indication to initiate the DTLS negotiation, wherein the second indication specifies the destination address of the first private LAN controller; and
   transmitting, by the LAN controller to the first private LAN controller, a third indication to establish the first CAPWAP tunnel.

4. The method of claim 3, further comprising:
   determining that the first device has been authenticated based on an EAP identification information provided by the first device.

5. The method of claim 1, further comprising:
   determining, by the LAN controller, that a second device has connected to the first wireless AP using a second predefined SSID;
   receiving, by the LAN controller from the second device, an Extensible Authentication Protocol (EAP) response specifying a destination address of a second private LAN controller associated with a second private network;
   creating, by the LAN controller based on the destination address of the second private LAN controller associated with the second private network, a second CAPWAP tunnel between the first wireless AP and the second private LAN controller; and
   configuring, by the LAN controller, the first wireless AP to broadcast a second private SSID associated with the second private network, wherein the second device accesses the second private network via the second CAPWAP tunnel by connecting to the first wireless AP using the second private SSID.

6. The method of claim 1, further comprising:
   enabling data link encryption on the first CAPWAP tunnel between the first wireless AP and the first private LAN controller.

7. The method of claim 1, further comprising storing, in a network address translation (NAT) table of the LAN controller:
   (i) an indication specifying to modify a source Internet protocol (IP) address of data packets sent by the first device from an IP address of the first device to an IP address of the LAN controller;
   (ii) an indication specifying to modify a destination IP address of data packets sent by the first device to an IP address of the first private LAN controller; and
   (iii) an indication specifying to modify, for received data packets targeting the first device, a respective destination IP address to the IP address of the first device.

8. A system, comprising:
   a computer processor; and
   a memory containing a program which when executed by the computer processor performs an operation comprising:
   determining that a first device has connected to a first wireless access point (AP), of a plurality of wireless APs, using a predefined service set identifier (SSID) relating to a first private local area network (LAN) controller associated with a first private network and broadcast by the first wireless AP;
   in response to the determining that the first device has connected to the first wireless AP, receiving, from the first device, an Extensible Authentication Protocol (EAP) response specifying a destination address of the first private LAN controller associated with the first private network;
   creating, based on the destination address and in response to the connection of the first device to the first wireless AP using the predefined SSID, a first Control and Provisioning of Wireless Access Points (CAPWAP) tunnel between the first wireless AP and the first private LAN controller, wherein the creating the first CAPWAP tunnel comprises the first wireless AP initiating Datagram Transport Layer Security (DTLS) negotiation with a LAN controller for establishing the first CAPWAP tunnel;

aggregating a plurality of CAPWAP tunnels between the plurality of wireless APs and the first private LAN controller such that only an aggregated CAPWAP tunnel exists between the LAN controller and the first private LAN controller; and in response to the creating the first CAPWAP tunnel, configuring the first wireless AP to broadcast a private SSID associated with the first private network, wherein the first device is configured to access the first private network via the first CAPWAP tunnel by disconnecting from the connection with the first wireless AP using the predefined SSID and establishing a new connection with the first wireless AP using the private SSID.

9. The system of claim 8, the operation further comprising prior to the receiving the EAP response:
transmitting an EAP request to the first device, wherein the first device generates and transmits the EAP response responsive to receiving the EAP request.

10. The system of claim 8, wherein the creating the first CAPWAP tunnel further comprises:
transmitting, to the first wireless AP, a first indication to establish the first CAPWAP tunnel;
transmitting, by the first wireless AP, a second indication to initiate the DTLS negotiation, wherein the second indication specifies the destination address of the first private LAN controller;
transmitting, to the first private LAN controller, a third indication to establish the first CAPWAP tunnel; and
determining that the first device has been authenticated based on an EAP identification information provided by the first device.

11. The system of claim 8, the operation further comprising:
determining that a second device has connected to the first wireless AP using a second predefined SSID;
receiving, from the second device, an Extensible Authentication Protocol (EAP) response specifying a destination address of a second private LAN controller associated with a second private network;
creating, based on the destination address of the second private LAN controller associated with the second private network, a second CAPWAP tunnel between the first wireless AP and the second private LAN controller; and
configuring the first wireless AP to broadcast a second private SSID associated with the second private network, wherein the second device accesses the second private network via the second CAPWAP tunnel by connecting to the first wireless AP using the second private SSID.

12. The system of claim 8, the operation further comprising storing, in a network address translation (NAT) table of the LAN controller:
(i) an indication specifying to modify a source Internet protocol (IP) address of data packets sent by the first device from an IP address of the first device to an IP address of the LAN controller;
(ii) an indication specifying to modify a destination IP address of data packets sent by the first device to an IP address of the first private LAN controller; and
(iii) an indication specifying to modify, for received data packets targeting the first device, a respective destination IP address to the IP address of the first device.

13. A non-transitory computer-readable storage medium storing instructions which when executed by a processor cause the processor to perform an operation comprising:
determining, by a local area network (LAN) controller, that a first device has connected to a first wireless access point (AP), of a plurality of wireless APs, using a predefined service set identifier (SSID) relating to a first private LAN controller associated with a first private network and broadcast by the first wireless AP;
in response to the determining that the first device has connected to the first wireless AP, receiving, by the LAN controller from the first device, an Extensible Authentication Protocol (EAP) response specifying a destination address of the first private LAN controller associated with the first private network;
creating, by the LAN controller based on the destination address and in response to the connection of the first device to the first wireless AP using the predefined SSID, a first Control and Provisioning of Wireless Access Points (CAPWAP) tunnel between the first wireless AP and the first private LAN controller, wherein the creating the first CAPWAP tunnel comprises the first wireless AP initiating Datagram Transport Layer Security (DTLS) negotiation with the LAN controller for establishing the first CAPWAP tunnel;
aggregating, by the LAN controller, a plurality of CAPWAP tunnels between the plurality of wireless APs and the first private LAN controller such that only an aggregated CAPWAP tunnel exists between the LAN controller and the first private LAN controller; and
in response to the creating the first CAPWAP tunnel, configuring, by the LAN controller, the first wireless AP to broadcast a private SSID associated with the first private network, wherein the first device is configured to access the first private network via the first CAPWAP tunnel by disconnecting from the connection with the first wireless AP that uses the predefined SSID and establishing a new connection with the first wireless AP using the private SSID.

14. The non-transitory computer-readable storage medium of claim 13, further comprising prior to the receiving the EAP response:
transmitting, by the LAN controller, an EAP request to the first device, wherein the first device generates and transmits the EAP response responsive to receiving the EAP request.

15. The non-transitory computer-readable storage medium of claim 13, wherein the creating the first CAPWAP tunnel further comprises:
transmitting, by the LAN controller to the first wireless AP, a first indication to establish the first CAPWAP tunnel;
transmitting, by the first wireless AP to the LAN controller, a second indication to initiate the DTLS negotiation, wherein the second indication specifies the destination address of the first private LAN controller;
transmitting, by the LAN controller to the first private LAN controller, a third indication to establish the first CAPWAP tunnel; and determining that the first device has been authenticated based on an EAP identification information provided by the first device.

16. The non-transitory computer-readable storage medium of claim 13, the operation further comprising:
   determining, by the LAN controller, that a second device has connected to the first wireless AP using a second predefined SSID;
   receiving, by the LAN controller from the second device, an Extensible Authentication Protocol (EAP) response specifying a destination address of a second private LAN controller associated with a second private network;
   creating, by the LAN controller based on the destination address of the second private LAN controller associated with the second private network, a second CAPWAP tunnel between the first wireless AP and the second private LAN controller; and
   configuring, by the LAN controller, the first wireless AP to broadcast a second private SSID associated with the second private network, wherein the second device accesses the second private network via the second CAPWAP tunnel by connecting to the first wireless AP using the second private SSID.

17. The non-transitory computer-readable storage medium of claim 13, further comprising storing, in a network address translation (NAT) table of the LAN controller:
   (i) an indication specifying to modify a source Internet protocol (IP) address of data packets sent by the first device from an IP address of the first device to an IP address of the LAN controller;
   (ii) an indication specifying to modify a destination IP address of data packets sent by the first device to an IP address of the first private LAN controller; and
   (iii) an indication specifying to modify, for received data packets targeting the first device, a respective destination IP address to the IP address of the first device.

* * * * *

UNITED STATES PATENT AND TRADEMARK OFFICE
CERTIFICATE OF CORRECTION

| | | |
|---|---|---|
| PATENT NO. | : 11,019,032 B2 | Page 1 of 1 |
| APPLICATION NO. | : 16/126783 | |
| DATED | : May 25, 2021 | |
| INVENTOR(S) | : Igor Slutsker et al. | |

It is certified that error appears in the above-identified patent and that said Letters Patent is hereby corrected as shown below:

On the Title Page

Item (30), in Column 1, under "Foreign Application Priority Data", Line 1, delete "7190721" and insert -- 17190721.5 --, therefor.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*